United States Patent
Zheng et al.

(10) Patent No.: US 8,546,503 B2
(45) Date of Patent: Oct. 1, 2013

(54) METHOD FOR CONTROLLING ANIONIC POLYMERIZATION

(75) Inventors: Anna Zheng, Shanghai (CN); Jian Zhang, Shanghai (CN); Yong Guan, Shanghai (CN); Fuzeng Hu, Shanghai (CN); Dafu Wei, Shanghai (CN); Shuzhong Wang, Shanghai (CN)

(73) Assignee: East China University Of Science And Technology; Shanghai Fuen Plast-Rubber Corporation Of Science And Technology, Shanghai (CN)

( * ) Notice: Subject to any disclaimer, the term of this patent is extended or adjusted under 35 U.S.C. 154(b) by 0 days.

(21) Appl. No.: 13/145,868

(22) PCT Filed: Jan. 24, 2009

(86) PCT No.: PCT/CN2009/070315
§ 371 (c)(1),
(2), (4) Date: Oct. 10, 2011

(87) PCT Pub. No.: WO2010/083657
PCT Pub. Date: Jul. 29, 2010

(65) Prior Publication Data
US 2012/0116023 A1    May 10, 2012

(51) Int. Cl.
*C08F 2/00* (2006.01)
*C08F 112/08* (2006.01)
*C08F 4/00* (2006.01)

(52) U.S. Cl.
USPC ......... 526/210; 526/212; 526/347.2; 525/267

(58) Field of Classification Search
USPC ................ 525/267; 526/210, 212, 347.2
See application file for complete search history.

(56) References Cited

U.S. PATENT DOCUMENTS 5,595,951 A * 1/1997 Halasa et al. ............... 502/154
2002/0128426 A1 * 9/2002 Schreffler et al. ........... 528/272

FOREIGN PATENT DOCUMENTS

CN    101429256 A    5/2009

* cited by examiner

*Primary Examiner* — William Cheung
(74) *Attorney, Agent, or Firm* — Harness, Dickey & Pierce, P.L.C.

(57) ABSTRACT

This invention deals with an approach to control anionic polymerization. The anionic polymerization is conducted by adding a kind of initiator ligand compound, directly or in the form of solution into the monomer or initiator at the same or different time, or at different stages. The metal atoms in the ligand can form the association with the initiator cations, while the alkyloxy groups in the initiator ligand can restrict the entering channel of the addition of the monomers due to their relatively large volume or steric hindrance. Therefore, the initiator ligand compound can restrict the rate of anionic polymerization, restrain the side reaction, and make the anionic polymerization possible to be conducted at room or even higher temperature. The molar ratio of initiator ligand compound to initiator is from 0.01:1 to 20:1. Compared with present technologies, the method of this invention can control and adjust the homopolymerization and copolymerization rate, side reactions and the polymerization temperature, and make it possible to industrialize.

14 Claims, No Drawings

METHOD FOR CONTROLLING ANIONIC POLYMERIZATION

This application is the National Stage application of PCT International Application No. PCT/CN2009/070315, filed Jan. 24, 2009.

FIELD OF THE INVENTION

This invention deals with the anionic polymerization technique of macromolecular material, especially with a novel method for adjusting and controlling the reaction rate, side reaction and temperature of ionic polymerization, as well as the initiator ligand compound used in the method.

BACKGROUND OF THE INVENTION

Anionic polymerization has been widely applied in the field of polymer synthesis, due to its advantages, such as fast initiation and propagation, almost no termination, controllable molecular weight, narrow molecular weight distribution, and definite molecular structure. Under a proper condition, the chain termination or transfer reactions would not be happened in the anionic polymerization, the living chain could preserve polymerization activity until the monomers are exhausted. Functionalized telechelic polymers or block copolymers with deferent structures could be obtained by adding proper endcapper or a second kind of monomers. However, because of the extremely fast polymerization rate, great amount of heat instantaneously produced during anionic polymerization would lead the reaction hardly to control in its industrialization. Reducing polymerization temperature could result extremely high viscosity of intermediate products, especially for high concentration solution or bulk polymerization, which could cause the difficulties of stirring and instability of products. Furthermore, the molecular weight of the final products would be changed when the dosage of initiator is reduced. Therefore, all the industrialized anionic polymerization utilizes solution polymerization. Furthermore, adding a massive amount of solvent to dilute the solution and decrease the viscosity will lead to the solvent reprocessing and environment problems. In addition, for the anionic polymerization of certain monomers (especially alkadiene and monomers containing ester group), the excessive rate or higher temperature easily lead to a great amount of side reactions, even no target product can be obtained, which seriously hinders the industrialization process of anionic polymerization. To date, only a limited kinds of monomers could be applied in industrialized ionic polymerization.

Therefore, research on the additives to control and adjust anionic polymerization has not been interrupted. Certain additives and related theory have also been put forward. Shengkang Ying (Shengkang Ying, Shaohua Guo et al. Ionic Polymerizations. Beijing: Chemical Industry Press, 1988), Guantai Jin (Lianbao Xue, Guantai Jin. Theory and Application of Anionic Polymerization. Beijing: China Friendship Publishing Company, 1990) et al reported that using polar modifiers (THF, diethylene glycol dimethyl ether, N,N,N,N-tetramethylethylenediamine) could disassociate the initiator aggregations of anionic polymerization, and all the initiators were initiated simultaneously. The use of such polar modifiers not only accelerated the polymerization rate, made the polymerization could be carried out at lower temperature, but also narrowed the molecular weight distribution to near 1. The methods made a great contribution to the theory and applications of anionic polymerization, but could only accelerate polymerization rate, decrease the reaction temperature and increase the amount of random products. However, there is no effective reverse controlling method, i.e., which can reduce the reaction rate, decrease side reaction and increase reaction temperature. So the mentioned methods could not solve the problems of gels and other side reactions in the process of bulk and high concentration solution polymerization of styrene butadiene rubber, and the problem that many reactions have only to be carried out at dozens of degree below zero, which made the methods lack practice industrial value. Intense application demand promotes the research on this field.

At the beginning, the cocatalysts added in coordination polymerization were directly used into anionic polymerization systems. For example, early in the 1960s Welch F. J. reported the influence of adding Lewis acids or bases into the n-BuLi catalyst system on the polymerization rate of styrene anionic polymerization [Polymerization of styrene by butyl-lithium. II. Effect of Lewis acid and bases. Journal of the American Chemical Society (1960), 82, 6000-5]. The result shown that a small quantity of Lewis bases (such as ethers, etc) could accelerate the anionic polymerization rate of styrene, while Lewis acids (such as alkyl aluminums) would decrease the polymerization rate. The polymerization would be ceased if adding more than the stoichiometric amount of Lewis acids.

Hsieh and Wang studied the coordinated compounds formed from dibutylmagnesium with alkyllithium initiator and/or living polymer chains with or without THF presence. They found that dibutylmagnesium could decrease the polymerization rate of styrene and butadiene, but had no influence on its stereochemistry (Macromolecules, 19 (1966), 299-304).

Patent CN 1646580A reported an anionic polymerization method using composed initiator, which contained at least one alkali metal hydride selected from LiH, NaH and KH, and at least one organic aluminium compound. Among them, the alkali metal hydride was used as anionic polymerization initiator, and the organic aluminium compound could improve the solubility of the alkali metal hydride in solvent. The organic aluminium compounds could not only improve the activity of alkali metal hydride through coordination, but also reduce the polymerization rate of monomers.

Patent CN 1291205A reported a technique to delay anionic polymerization. Monomers were polymerized in the presence of at least one organic alkali metal compound, at least one organic magnesium compound and at least one organic aluminium compound. A composed initiator which could adjust the polymerization rate in a wide temperature and concentration range was also provided. The composed initiator contained organic magnesium compounds and organic aluminium compounds.

Patent CN 1291207A reported a technique of preparing block copolymer via delayed anionic polymerization, i.e. a method of block copolymer synthesized from vinyl aromatic monomers and diolefine. The polymerization was carried out in the presence of at least one organic alkali metal compound or alkali metal alkoxide, as well as at least one organic magnesium, aluminium or zinc compound. The synthesized block copolymers contained S-B-S, S-S/B-S, S-B-S/B-S and other block structures.

All the above patents and literatures described the method and examples delayed anionic polymerization reaction in detail, which were almost according to the same idea, i.e. using a composite to coordinate with the initiator to form a certain complex structure. For example, Alain Deffieux suggested that the hydride and organic aluminium compound can coordinate with initiator as the following formula [Polymer 46 (2005), 6836-6843]:

PSLi+i-Bu₃Al≈i-Bu₃Al:PSLi(1:1) Strong coordination i-Bu3Al:PSLi+PSLi≈i-Bu3Al:(PSLi)2(1:2) Weak coordination In the anionic polymerization system of (methyl)acrylic esters and other unsaturated monomers containing carbonyl group, the presence of carbonyl group will lead to a series of side reactions. Generally, a pre-endcapper such as 1,1-diphenylethlene (DPE) was used to increase the steric hindrance of initiators, reduce the polymerization temperature, and prevent carbonyl to take part in the reaction as much as possible. The pre-endcapper DPE can only efficiently avoid the side reactions of the carbonyl in the first monomer, but it can not efficiently avoid the carbonyl in the second monomer to take part in the reaction, because the influence of the steric hindrance becomes less or even disappears after the first monomer is added to the carbon anion of the initiator. At low temperature, the reaction activity of carbonyl group is very low, DPE can show its inhibition effection. However, with the increase of the reaction temperature, the reactivity of carbonyl becomes higher, adding DPE will have no inhibition effect.

Most of the above methods, especially the proposed theories are conjectures, and lack direct and effective experimental evidences. Therefore, they can not explain the relationships between these mechanisms and polymerization temperature accurately. Furthermore, this coordination compound system needs two or more substances and the feeding process is relatively complicated. Organic magnesium and aluminium compounds are inflammable and explosive, and can easily react with the oxygen and moisture in the air. Therefore, their transportation and processing are difficult. These compounds are very insecure in manufacturing production. Meanwhile, the control on the amount of additives requires high precision; otherwise the influence to products will be distinctive. In addition, these coordination compounds have relatively strong nucleophilicity, so that they will directly influence on the fictionalization of follow-up products. For example, in the synthesis process of hydroxyl-terminated polybutadiene, epoxy ethane is directly added in the final stage of butadiene anionic polymerization, then terminated by methanol, the target product can be obtained; If there are organic magnesium or aluminium compounds remained, ring-opening reaction with the added epoxy ethane will happen, resulting in byproducts and lose of reagents. Therefore, these coordination compounds have a big problem not only in theory but also in application.

DETAILED DESCRIPTION OF THE INVENTION

The purpose of this invention is to overcome the shortcomings of the present techniques and provides a method which can restrict the rate of anionic polymerization, restrain the side reactions, and increase the polymerization temperature, so that can control the anionic polymerization reaction.

The purpose can be achieved through the following procedures:

A method to control the anionic polymerization has the characteristic that the anionic polymerization is processed by adding an initiator ligand compound. The initiator ligand compound can be added directly or in the form of solution into the monomer or initiator at the same or different time, or different stages. Owing to the association of the initiator ligand compound and initiator cations, the alkyloxy group in the initiator ligand compound has large volume or steric hindrance and can restrict the entering channel of the adding of monomer. Therefore, the initiator ligand compound can restrict the rate of anionic polymerization, restrain the side reaction, and make the anionic polymerization possible to be carried out at room or even higher temperature. The molar ratio of initiator ligand compound to initiator is from 0.01:1 to 20:1.

The mentioned initiator ligand compound has the following structure:

$$R[OM]_n,$$

Where n is an integer from 1 to 3, M is alkali metal, R is the organic part, which includes the alkyl with large volume or steric hindrance and its derivatives, or aromatic hydrocarbonyl and its derivatives.

The mentioned alkali metals include Li and Na, the mentioned organic groups include t-butyl, phenyl, benzyl, biphenyl, 2,2-bis(4,4'-phenyl) propyl, naphthyl, and anthryl.

The mentioned organic part stems from an alkyloxy compound, which can ensure the ligand compound dissolved in the monomers or the used organic solvents. The ligand compound itself can not initiate the polymerization and terminate the active species.

The mentioned alkyloxy groups include phenolic group, biphenyloxy, naphthyloxy, benzyloxy, anthranolic group, and their alkyl substituted derivatives, as well as a kind of groups having large volume or steric hindrance, such as multiple-isobutoxy, multiple-t-butoxy.

The mentioned polymerization can be processed in the presence of solvents. The mentioned solvents include aliphatic hydrocarbons, cycloalkanes aromatic hydrocarbons, ethers containing 4-12 carbon atoms or other inert hydrocarbons, such as hexane, heptanes, pentane, cyclohexane, methyl-cyclohexane, benzene, toluene, xyline, ethyl benzene, and their mixture, tetrahydrafuran dioxane et. al. The mentioned inert hydrocarbon solvents include n-hexane, cyclohexane, paraffin-wax, toluene, tetrahydrofuran, and their mixture solvent.

The mentioned initiator is sodium naphthalene or alkyl lithium compounds, including n-butyllithium, ethyllithium, n-propyllithium, isopropylaniline, sec-butyllithium, tertiary butyllithium, phenyllithium, diphenyl-hexyllithium, butadienyllithium, polystyryllithium, or multifunctional lithium compounds, such as 1,4-dilithium benzene, 1,4-dilithium butane, and 1,4-dilithium hexane.

The mentioned initiator ligand compounds can be added into the initiator to form a coordinated complex or added directly into the system.

The mentioned initiator ligand compound is dissolved in the inert hydrocarbon, monomer or initiator, keeping 5 min at 0-30° C. A proper solubilizer such as diphenylethylene can be added.

The present invent has realized to control the rate of anionic polymerization, side reactions, and polymerization temperature by adding the initiator ligand compounds into the polymerization system. The initiator ligand compounds include alkyloxy compounds with special structure of alkali metal, which combine with the initiator to form a complex initiation system and control the anionic homopolymerization or copolymerization rate, side reactions and the polymerization temperature by setting the chemical structures of initiator ligand compounds. The advantages of this invent are as the following:

(1) To realize controlling the rate of polymerization, side reactions and the polymerization temperature through using organic alkyloxy metals as initiator ligand compounds, and making these metal atoms associating with initiator, the alkyloxy with large volume or steric hindrance filling between initiator cations and initiator anions therefore, it can make it difficult for the monomer or functional groups to insert the reacting channel and take part in the polymerization.

(2) To eliminate the uncontrollable implosion polymerization during the bulk anionic polymerization system, and avoid the gelation in the anionic polymerization system of dienes, such as polymerization of styrene butadiene rubber, at higher temperature. To eliminate side reactions, the polymerization of the unsaturated monomers with carbonyl groups has to be conducted at a deep cooled temperature. Now, this polymerization can be carried out at room or even higher temperature using the method based on this invention.

(3) To provide a series of initiator ligand compounds, with mild properties, easily to be industrialized and stored. They are also very efficient, convenient to use, and safe to people.

EXAMPLES

The following examples are used to illustrate this invention, but not to restrict the range of the invention. The experimental methods which don't unmark the special conditions usually follow the conventional conditions or that manufacturer suggested. Expect special explain, all percentage, ratio, proportion, or composition ratio is measured in weight.

The percentage of weight/volume usually represents the weight of solute in the 100 ml solution, which is familiar to the technicians in this field.

Except the special definition, all the major and scientific words have the same meaning as the technicians know in this field. In addition, any similar methods and materials reported in the articles all can be used in this invention. The optimal samples and materials only have demonstration effect in this invent.

Material: styrene, isoprene, 1,3-butadiene, methyl methacrylate (MMA), tert-butyl methacrylate, n-butyllithium, 1,1-diphenylethylene (DPE), sodium naphthalene, sec-butyllithium, tert-butyllithium, isopropyllithium, methanol, cyclohexane, tetrahydrofuran.

The molecular weight and the molecular weight distribution of the polymers were tested by gel permeation chromatography (GPC) with three styrene-divinylbezen gel separation columns (35° C., 300×8 mm), using tetrahydrofuran as the eluent. The flow rate was 1 ml/min. The GPC is equipped with a double detection systems composed of a differential refractmeter and eighteen angle laser light scattering meter, which can measure the absolute molecular weight and its distribution of the samples. For $^1$H-NMR tests, chloroform-D1 was used as the solvent and tetramethyl silicane (TMS) was used as the internal standard.

Example 1

Synthesis of Polystyrene 25 ml of cyclohexane was added into the reactor at room temperature, followed by adding lithium phenolate (as initiator ligand compound) and sodium naphthalene (as initiator) in molar ratio 1:1. After the mixture was stirred uniformly, 12 ml of styrene was added into the system. The designed molecular weight was 10,000. The temperature of the reaction mixture was gradually raised to 50° C., and kept for 2 h. Afterwards, 1 ml of methanol was added to terminate the polymerization. The conversion, molecular weight and molecular weight distribution of the product were listed in Table 1.

Comparative Example 1

The polymerization procedures were similar to Example 1, except the addition of the initiator ligand compound (lithium phenolate). The results of Comparative Example 1 were also listed in Table 1.

TABLE 1

| | Polystyrene | | | | | |
|---|---|---|---|---|---|---|
| | Mn designed | Styrene | Reaction time | Conversion | Mn | Mw/Mn |
| Example 1 | 10000 | 12 ml | 2 h | 68% | 6460 | 1.21 |
| Comparative Example 1 | 10000 | 12 ml | 2 h | 100% | 10400 | 1.15 |

The GPC profiles of the Example 1 presented a unimodal distribution. The Mn of PS obtained was lower than the designed, and the yield was obviously lower than 100%, which indicated that lithium phenolate had obvious effect of controlling polymerization rate, and litter effect on the molecular weight distribution of the product. In the above both Examples, 0.2 ml of tetrahydrofuran was added in each reaction system.

Example 2

Polymerization of Methyl Methacrylate (MMA)

48 ml of toluene was added into the reactor at 0° C., followed by equimolar lithium naphtholate (as initiator ligand compound) and DPHLi (as initiator, prepared by reaction of n-BuLi and DPE in equimolar). After well-stirred, 5 ml of MMA was added in the system. The designed molecular weight was 2500. Then the temperature of the reaction mixture was gradually raised to 20° C., and kept for 20 min. Finally, added 1 ml of methanol was added to terminate the active species. The conversion, molecular weight and molecular weight distribution of the product were listed in Table 2.

Comparative Example 2

The polymerization procedure was the same as that of Example 2, except the addition of the initiator ligand compound (lithium naphtholate). The results of Comparative Example 2 were also listed in Table 2.

TABLE 2

| | Polymethyl methacrylate | | | | | |
|---|---|---|---|---|---|---|
| | Mn designed | MMA | Reaction time | Conversion | Mn | Mw/Mn |
| Example 2 | 2500 | 5 ml | 20 min | 100% | 2610 | 1.16 |
| Comparative Example 2 | 2500 | 5 ml | 20 min | 100% | 3230 | 1.49 |

The GPC profile of Comparative Example 2 appeared bimodal distribution. The Mn measured was higher than designed, and the yield was approached 100%, indicating that the side reactions caused by carbonyl had occurred. Meanwhile, the GPC profile of Example 2 exhibited unimodal distribution with narrow MWD, owing to the added initiator ligand compound, which demonstrated that the initiator ligand compound plays an efficacious part in controlling side reactions. It can be known from the results that at the same conditions, PMMA sample with narrow MWD can not be prepared without adding initiator ligand compound.

Example 3

Synthesis of Poly (MMA-b-t-BMA)

60 ml of toluene was added into the reactor at 0° C., followed by equimolar hydruquinone lithium (as initiator ligand compound) and DPHLi (as initiator, prepared by the reaction of n-BuLi and DPE in equimolar). After well-stirred, 5 ml of methyl methacrylate (MMA) was added into the system. The designed Mn of PMMA segment was 2500. Then the reaction temperature was raised to 20° C., and kept for 20 min. After the first step was completed, 7.66 ml of tert-butyl methacrylate (tBMA, equimolar with MMA) was added into the reactor. The designed Mn of PtBMA segment was 3550. Then the reaction was kept at the same temperature for 30 min. Finally, 1 ml of methanol added to terminate the active species. The conversion, molecular weight and molecular weight distribution of the product were listed in Table 3.

Comparative Example 3

The polymerization procedure was the same as that of Example 3, except the addition of the initiator ligand compound (hydroquinone lithium). The results of Comparative Example 3 were shown in Table 3.

TABLE 3

| | PMMA-b-PtBMA | | | | | | |
|---|---|---|---|---|---|---|---|
| | Mn designed | MMA | tBMA | Reaction time | Conversion | Mn | Mw/Mn |
| Example 3 | 6050 | 5 ml | 7.66 ml | 20 min | 100% | 6210 | 1.18 |
| Comparative Example 3 | 6050 | 5 ml | 7.66 ml | 20 min | 95% | 7740 | 1.71 |

The GPC profile of Comparative Example 3 appeared bimodal distribution. The measured Mn of the block polymer was much higher than designed, its yield did not achieve 100% and its MWD became wider, indicating that side reactions produced from carbonyl seriously influenced the composition of the block polymer. It is inappropriate to synthesize block copolymer or homopolymer directly at 20° C. via anionic polymerization of the monomers containing carbonyl groups. Meanwhile, the GPC profile of Example 3 containing initiator ligand compound exhibited unimodal distribution with narrow MWD, indicating that the initiator ligand compound taken an efficacious part in controlling side reactions, without obvious effect on the Mn and MWD. However, under the same reaction conditions, block copolymer with narrow MWD can not be achieved without initiator ligand compound.

Example 4

Synthesis of Poly (St-b-MMA)

60 ml of toluene and 0.6 ml of THF were added to the reactor at 0° C., followed by s-BuLi (as initiator). After well-stirred, 12 ml of styrene was added into the reactor. The designed Mn of PS segment was 5000. The reaction temperature was raised to 20° C. and kept for 2 h. After the first step was completed, hydroquinone lithium equimolar with initiator and excessive DPE were added into the system. The solution appeared deep red then. Samples were taken out for analyses (designed Mn at this stage should be 5180), and the results were shown in Table 4. Then, 11.07 ml of MMA (equimolar with styrene) was added into the system, the designed Mn of PMMA segment was 4800. The system was kept for 30 min at the same temperature. Finally 1 ml of methanol was added to terminate the active species. The Mn and MWD of the copolymer were shown in Table 5.

Comparative Example 4

The polymerization procedure was the same as that of Example 4, except the addition of the initiator ligand compound (hydroquinone lithium). The results were shown in the Table 5.

TABLE 4

| | Polystyrene (Mn calculated is 5180) | | | | | |
|---|---|---|---|---|---|---|
| | Mn designed | Styrene | Reaction time | Conversion | Mn | Mw/Mn |
| Example 4 (PS) | 5180 | 12 ml | 2 h | 100% | 5210 | 1.10 |
| Comparative Example 4 (PS) | 5180 | 12 ml | 2 h | 100% | 5130 | 1.11 |

TABLE 5

| | PS-PMMA (Mn designed is 9980) | | | | | |
|---|---|---|---|---|---|---|
| | Mn designed | MMA | Reaction time | Conversion | Mn | Mw/Mn |
| Example 4 (PS-PMMA) | 9980 | 11.07 ml | 30 min | 100% | 10210 | 1.16 |
| Comparative Example 4 (PS-PMMA) | 9980 | 11.07 ml | 30 min | 97% | 13540 | 1.41 |

The GPC profile of the Comparative example 4 presented bimodal distribution. The measured Mn of the block copolymer was much higher than designed. Meanwhile, the yield could not reach 100%, indicating that the byproduct caused from nucleophilic reaction of carbonyl was produced. The side reactions affected the molecular weight and MWD of the products and led to the higher Mn and the broader MWD. Meanwhile, the GPC profile of Example 4 exhibited unimodal distribution with narrow MWD, indicating the initiator ligand compound could control the side reaction efficiently, without obvious effect on the Mn and MWD. Under the same conditions, the reaction without initiator ligand compound could not obtain block copolymer with narrow MWD. The effect of initiator ligand compound is rather significant.

Example 5

Solution Polymerization of S/B Diblock Copolymer 800 ml of cyclohexane, 200 g of styrene and butadiene mixer (mass ratio 4:6) and 10 ml of THF were added into a 2 L autoclave at 20° C. Then 2 ml of tert-butyllithium solution (1.0 mol/L) were added as the initiator. After well stirred, the reaction temperature was gradually raised to 160° C., and kept for 2 h. After the reaction completed, GPC and $^1$H-NMR were used to analyze the products and the results were shown in Table 6.

Comparative Example 5

The polymerization procedure was the same as that of Example 5, the only difference was addition of initiator ligand compound (hydroquinone lithium, mixed with a little toluene solvent, molar ratio with living species was 0.5:1) before polymerization. The results were also shown in Table 6.

TABLE 6

| | S/B diblock copolymer | | | | | |
|---|---|---|---|---|---|---|
| | Mn designed | Phenomenon | 1,4structure$^b$ | Yield | Mn | Mw/Mn |
| Example 5 | 100000 | Partial gel | 45% | — | 95210$^a$ | 1.34 |
| Comparative Example 5 | 100000 | Normal | 57% | 100% | 110230 | 1.25 |

$^a$Mn is the number average molecular weight of sample after removeing the gel.
$^b$The percentage of 1,4-structure segment to the total polybutadiene segment.

The results of Example 5, suggested that gel would be produced in the S/B copolymer at the higher reaction temperature without adding initiator ligand compound. However, there was no gel in the sample of Comparative Example 5, and its molecular weigh was essentially the same as designed. Therefore, the initiator ligand compound could control side reaction and would not change the chemical structure of the product.

Example 6

Bulk Polymerization of Multiple Block S/B Copolymer in a Twin-Screw Extruder Styrene and butadiene mixer (6/4, mass ratio) was pumped into a twin-screw extruder with 1.8 Kg/h feed speed by a metering pump at 0° C. At the same time, n-BuLi (as initiator, 0.15 mol/L) was pumped with 2 ml/min by another metering pump. The designed molecular weight was 100,000. The product was analyzed by GPC and $^1$H-NMR, and the results were shown in Table 7.

Comparative Example 6

The polymerization procedure was the same as that of Example 6, and the only difference was the addition of initiator ligand compound (lithium anthranolate, mixed in a little styrene monomer, the molar ratio to the living species was 2:1). The results were also shown in Table 7.

TABLE 7

| | Multiple block S/B copolymer | | | | | |
|---|---|---|---|---|---|---|
| | Mn designed | Phenomenon | 1,4structure$^b$ | Conversion | Mn | Mw/Mn |
| Example 6 | 100000 | Gel | — | — | — | 1.34 |
| Comparative Example 6 | 100000 | Normal | 78% | 100% | 112480 | 1.25 |

$^b$The percentage of 1,4-structure segment to the total polybutadiene segment.

The Example 6 was similar to the Comparative Example 6, except that there was no initiator ligand compound. During extruding process of Example 6, the products were almost totally gelled and hardly could be extruded out, resulting the blockage of the twin-extruder. The extruder had to be stopped. In Comparative Example 6 added initiator ligand compound, the products could be extruded smoothly. Its molecular weight distribution was narrow, and its molecular weigh was also controllable. Its 1,4-structure was more than that of the sample with the addition of THF.

Example 7

Initiator ligand compound was directly added into initiator in the molar ratio of 0.01:1. In the initiator complex, the metal atoms of the initiator ligand compound would associate with the cations of initiator, the alkyloxy groups with large volume or steric hindrance would restrict the entering passage of monomer addition, so could inhibit polymerization rate and side reaction, control and adjust the polymerization temperature. The polymerization procedure was the same as that of Example 1.

Example 8

Initiator ligand compound was directly added into initiator in the molar ratio of 20:1, and DPE was also added as solubilizer. The initiator complex was kept for 5 min at 30° C. to perform the anionic polymerization. The metal atoms in initiator ligand compound would associate with the cations of initiator, the alkyloxy groups with large volume or steric hindrance would restrict the entering passage of monomer addition, so could inhibit polymerization rate and side reaction, control and adjust the polymerization temperature. The polymerization procedure was the same as that of Example 1.

It can be seen from the results of all above Examples and Comparative Examples that the initiator ligand compound not only can control polymerization rate and stabilize living species, but also can inhibit side reaction in anionic polymerization.

All these cited literatures were used as references in this invention. It just like that each literature was cited as a reference individually. In addition, after reading this invitation content, the technicians in this field can modify or revise this invention. However, all these modified or revised contents are limited in the rights of this application.

What is claimed is:

1. A method for controlling an anionic polymerization, comprising:
    adding an initiator ligand compound and an initiator to a polymerization reaction,
    adding diphenylethylene to the polymerization reaction, and
    keeping the polymerization reaction at 0 to 30° C. for at least 5 minutes,
    wherein a molar ratio of the initiator ligand compound to the initiator is from 0.01:1 to 20:1.

2. The method of claim 1, wherein the initiator ligand compound has the following structure:

$R[OM]_n$, wherein
    n is an integer from 1 to 3;
    M is an alkali metal; and
    R is an organic moiety which includes alkyl or aromatic group.

3. The method of claim 1, wherein the polymerization reaction is maintained for 5 minutes from when the initiator ligand compound is dissolved.

4. The method of claim 1, further comprising:
    a stirring step after the adding an initiator ligand compound and an initiator.

5. The method of claim 1, wherein the initiator ligand compound is added directly or in the form of a solution to the polymerization reaction.

6. The method of claim 1, wherein the initiator ligand compound and the initiator are added at different stages.

7. The method of claim 1, wherein the initiator ligand compound is added in a manner that the alkali metal is associated with an initiator cation.

8. The method of claim 1, wherein the alkali metal is Li or Na, and wherein the organic moiety includes t-butyl, phenyl, benzyl, biphenyl, 2,2-bis(4,4'-phenyl)propyl, naphthyl or anthryl.

9. The method of claim 1, wherein the organic moiety contains an alkyloxy-containing moiety.

10. The method of claim 1, wherein the organic moiety contains phenolic group, biphenyloxy, naphthyloxy, benzyloxy, anthranolic group, isobutoxy or t-butoxy.

11. The method of claim 1, wherein the polymerization reaction is processed in the presence of a solvent.

12. The method of claim 11, wherein the solvent is selected from aliphatic hydrocarbons, cycloalkanes, aromatic hydrocarbons, ethers containing 4-12 carbon atoms, n-hexane, cyclohexane, paraffin-wax, toluene, tetrahydrofuran and mixtures thereof.

13. The method of claim 11, wherein the solvent is selected from hexane, heptanes, pentane, cyclohexane, methyl-cyclohexane, benzene, toluene, xylene, ethyl benzene, tetrahydrafuran and dioxane.

14. The method of claim 1, wherein the initiator is selected from sodium naphthalene n-butyllithium, ethyllithium, n-propyllithium, isopropyllithium, sec-butyllithium, tert-butyllithium, phenyllithium, diphenyl-hexyllithium, butadienyllithium, polystyryllithium, 1,4-dilithiumbenzene, 1,4-dilithiumbutane and 1,4-dilithiumhexane.

\* \* \* \* \*